INVENTORS
HUGO GERRIT BELJERS
KORNELIS SWIER KNOL
ANTON EDUARD PANNENBORG
BY Fred M Vogel
AGENT United States Patent Office 2,944,232
Patented July 5, 1960

2,944,232
DEVICE COMPRISING A CAVITY RESONATOR

Hugo Gerrit Beljers, Kornelis Swier Knol, and Anton Eduard Pannenborg, Emmasingel, Eindhoven, Netherlands, assignors, by mesne assignments, to North American Philips Company, Inc., New York, N.Y., a corporation of Delaware Filed Apr. 19, 1954, Ser. No. 424,134

Claims priority, application Netherlands Apr. 29, 1953

4 Claims. (Cl. 333—73)

This invention relates to devices comprising a cavity resonator containing a ferromagnetic body which is subject to the action of a polarising magnetic field.

A device of this kind has previously been suggested for amplitude modulation of a high-frequency oscillation in the resonator by variation of the polarising field, the amplitude modulation being based on the inner structure of the material used for the ferromagnetic body. In the device according to the invention variation in the resonance curve of the resonator under the action of the polarising field is obtained on the ground of quite different causes by a particular choice of the mode of oscillation of the resonator. Variation in the polarising field in this device likewise results in amplitude modulation of the high frequency oscillation, but this may be completely free from the phase modulation which was still noticeable in the device previously suggested, whilst furthermore the modulating process remains active for arbitrarily high frequencies of the high-frequency oscillation in the resonator.

According to the invention, a cavity resonator is used which is symmetrical across at least two different diameters thereof, such as a cavity having a circular or square cross-sectional shape, and a ferromagnetic body within this cavity is magnetically polarized at a value so as to cause the cavity, when electrically excited for producing an electrical transverse TE- mode of oscillation, to have two different resonance frequencies for the two circularly-polarized components of the transverse oscillation. By varying the strength of the magnetic polarization, the frequency spacing between the two different resonance frequencies can be varied.

In order that the invention may be readily carried into effect, it will now be described with reference to the accompanying drawing, given by way of example, in which Fig. 1 is an axial section of a device according to the invention.

Figure 1:
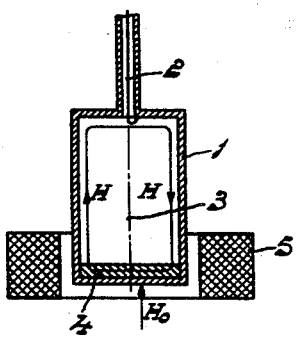
Figure 2:
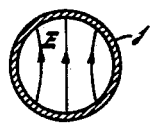
Fig. 2 shows the variation of the electric field strength in the resonator with reference to a cross-section.

Referring now to Fig. 1, reference numeral 1 indicates a cylindrical cavity resonator which is excited by way of a coupling loop 2 in transverse high-frequency oscillation of a wavelength, for example, of the order of 1 cm., that is to say that the electrical field passes from one half of the wall of the cylinder to the other half (see Fig. 2), so that the electrical field-strength component E of the high-frequency oscillation is at right angles to the axis of rotation 3 of the cylindrical cavity, whereas the magnetic field-strength component H, as may be seen from Fig. 1, is found to extend partly at right angles to the axis 3 and partly parallel thereto. Such mode of oscillation is indicated by the symbol $TE_{111}$.

Figure 3:
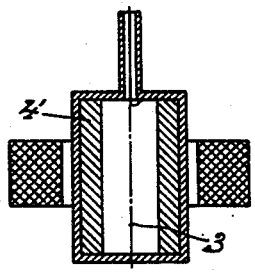
Fig. 3 shows a variant of the device of Fig. 1.

Provided in the bottom of the resonator 1 is a ferromagnetic body 4, preferably made of material having a large depth of penetration for the high-frequency oscillation, for example, ferrite, which body is subject to the action of a polarising magnetic field $H_0$ produced by a magnet 5. If desired, the body 4 may be replaced by a tubular ferromagnetic body 4' provided concentrically with the axis of rotation 3 or combined with this body (see Fig. 3), in which event comparatively small fields $H_0$ are sufficient.

Figure 4:
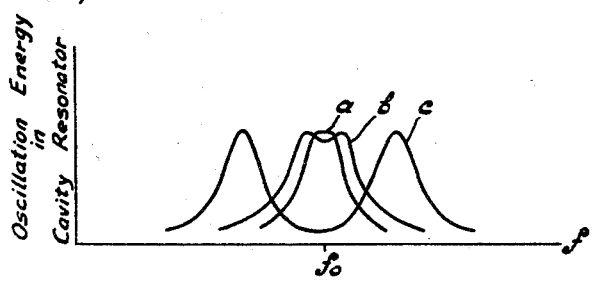
Fig. 4 shows characteristics of resonance curves obtained with such devices.

Fig. 4 shows resonance curves of such a cavity resonator for different values of the polarising field. The term "resonance curve" is to be understood here to mean the amplitude of the high-frequency oscillation generated in the resonator as a function of the frequency $f$ with a constant excitation oscillation at the coupling loop 2 and measured at different values of the strength H of the polarising field.

The curve $a$, which applies to a comparatively weak polarising field, is similar to the resonance curve of a bandpass filter coupled critically, the curves $b$ and $c$, which correspond to increasing values of the field strength $H_0$, being similar to those of bandpass filters coupled overcritically.

This behaviour may be explained as follows: The transverse high-frequency oscillation in the cavity resonator 1 may be decomposed into two circularly-polarised components of opposite senses of rotation about the axis of rotation 3. Said components can build up themselves as independent oscillations in the resonator 1 only if the resonator has natural frequencies which substantially coincide in at least two different directions, for example, at right angles to one another, the plane of which is parallel to the electrical field strength E, that is to say if the resonator has a cross-sectional area which is circular or, for example, square in shape. If, however, the resonator would have, for example, a rectangular cross-section, which thus corresponds to two different natural frequencies of the resonator in two relatively perpendicular directions, the said decomposition into circularly-polarised components has no real physical importance.

If the field $H_0$ is equal to zero, the ferromagnetic body 4 exerts the same influence upon the said two components, resulting in a resonance curve corresponding to that of a single circuit. However, if the field $H_0$ differs from zero, the susceptibility and the propagation constant of the body 4 become different for the two circularly-polarised oscillations, as is known, as a result of the Faraday effect, so that the resonator also has different resonance frequencies for the said two oscillations, from which ensues the group of characteristic lines shown in Fig. 4.

If a band-pass filter characteristic is desired having a constant band-width, for example, of the character of the curve $a$ or $b$ in Fig. 4, the magnet 5 may be in the form of a permanent magnet, for example, of a small disc of ferroxdure (not shown) which is pressed against the body 4. If, however, a variable band-width is desired, the magnetic field may be varied, for example, between the values of the polarisation field strength $H_0$ corresponding to the curves $a$ and $b$ in Fig. 4.

If the frequency of the excitation oscillation at the coupling loop 2 coincides with the resonance frequency $f_0$ of the resonator 1 with ferromagnetic body 4 non-polarised, the amplitude with which the oscillation is built up in the resonator 1 decreases if the strength $H_0$ of the polarisation field increases and more particularly if the body 4 has the flat shape shown in Fig. 1, the said amplitude is substantially linearly dependent upon the field strength $H_0$. However, since the phases of the two circularly-polarised oscillations are equal and of opposite sign for the frequency $f_0$, the variation in amplitude is substantially not accompanied by variation in phase, so that the device is excellently suitable for high-frequency amplitude modulation.

Figure 5:
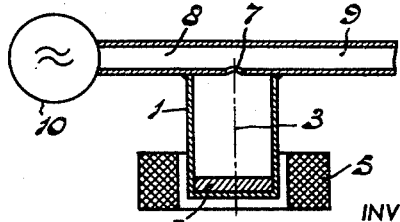
Fig. 5 shows in greater detail an embodiment which serves more particularly for amplitude modulation of a high-frequency oscillation.

Fig. 5 shows such an amplitude modulator comprising a resonator 1 having a ferromagnetic body 4 and a magnet 5 similar to that shown in Fig. 1. The resonator 1 is coupled by way of a coupling hole 7 provided concentrically with the axis 3 to a wave line 8, 9 of, for example, rectangular cross-section to which a high-frequency oscillation having a frequency substantially equal to $f_0$ is supplied by a wave generator 10, for example, a klystron generator, the resonator 1 bringing about a more or less strong reflection of the said oscillation as a function of the field $H_0$, so that both the oscillation reflected in the line 8 and the oscillation passed to the line 9 are modulated in amplitude.

The described phenomena may be found up to arbitrarily high frequencies corresponding to the natural frequency of the resonator. However, at lower frequencies, for example, up to about 10,000 mc./s., they may become less distinct, since in this case the resonator 1 is also liable to be damped and detuned in accordance with the strength $H_0$ of the polarisation field as a result of the inner structure of the ferromagnetic material of the body 4. However, this effect is found to disappear if the saturation magnetisation $4\pi I_s$ of the ferromagnetic material, multiplied by the gyromagnetic constant (=2.8 ms./s/ Gauss), remains smaller than the frequency of the transverse high-frequency oscillation.

What is claimed is:

1. A cavity resonator device comprising a cavity, a ferromagnetic material which exhibits the gyromagnetic effect at microwave frequencies being positioned with said cavity, magnetic field means for magnetically polarizing said ferromagnetic body in a direction parallel to the axis of said cavity, said cavity having symmetrical dimensions in at least two directions in a plane normal to said axis, so that said resonator device has at least two substantially equal natural frequencies of resonance corresponding to said two directions, and means for producing within said cavity a transverse high frequency oscillation having an electric field normal to the axis of said cavity, said magnetic polarization of said ferromagnetic body being sufficient to cause said cavity resonator device to have two different simultaneous resonant frequencies for the two circularly polarized components of said transverse oscillation.

2. A device as claimed in claim 1, including means for varying the value of said polarizing field, thereby to amplitude-modulate said high-frequency oscillation substantially without causing phase-modulation thereof.

3. A cavity resonator device comprising a cavity, a ferromagnetic material which exhibits the gyromagnetic effect at microwave frequencies being positioned with said cavity, magnetic field means for magnetically polarizing said ferromagnetic body in a direction parallel to the axis of said cavity, said cavity having symmetrical dimensions in at least two directions in a plane normal to said axis, so that said resonator device has at least two substantially equal natural frequencies of resonance corresponding to said two directions, and means for producing within said cavity a transverse high frequency oscillation having an electric field normal to the axis of said cavity, said magnetic polarization of said ferromagnetic body being sufficient to cause said cavity resonator device to have two different simultaneous resonant frequencies for the two circularly polarized components of said transverse oscillation, and means for adjusting said magnetic polarization to a value at which the resonance characteristic curve of said cavity is that of a bandpass filter.

4. A cavity resonator device comprising a cavity, a ferromagnetic material which exhibits the gyromagnetic effect at microwave frequencies being positioned with said cavity, magnetic field means for magnetically polarizing said ferromagnetic body in a direction parallel to the axis of said cavity, said cavity having symmetrical dimensions in at least two directions in a plane normal to said axis, so that said resonator device has at least two substantially equal natural frequencies of resonance corresponding to said two directions, and means for producing within said cavity a transverse high frequency oscillation having an electric field normal to the axis of said cavity, said magnetic polarization of said ferromagnetic body being sufficient to cause said cavity resonator device to have two different simultaneous resonant frequencies for the two circularly polarized components of said transverse oscillation, and means for adjusting said magnetic polarization to a value at which the resonance characteristic curve of said cavity resonator has two different resonance peaks.

References Cited in the file of this patent

UNITED STATES PATENTS

| 2,645,758 | van de Lindt | July 14, 1953 |
| 2,784,378 | Yager | Mar. 5, 1957 |
| 2,798,205 | Hogan | July 2, 1957 |

FOREIGN PATENTS

| 674,874 | Great Britain | July 2, 1952 |

OTHER REFERENCES

"Applied Scientific Research"; Section B, vol. 3, pages 142–144.

"Physica"; XIV, No. 10; February 1949; pages 629–641.

"Philips Technical Review"; vol. 11, No. 11; May 1950, pages 313–322.